United States Patent Office 3,788,864
Patented Jan. 29, 1974

3,788,864
REFRACTORY SAND MOLDS AND CORES
Paul F. Stephens, Allentown, Pa., assignor to
Bethlehem Steel Corporation
No Drawing. Continuation of application Ser. No.
130,447, Apr. 1, 1971, which is a continuation-in-part
of application Ser. No. 35,945, May 8, 1970, which in
turn is a continuation-in-part of application Ser. No.
799,551, Feb. 13, 1969, all now abandoned. This application Aug. 9, 1972, Ser. No. 275,651
Int. Cl. B28b 7/28
U.S. Cl. 106—38.3
2 Claims

ABSTRACT OF THE DISCLOSURE

A refractory mold and/or core suitable for casting molten ferrous metal and molten non-ferrous metal of the high lead and/or high tin copper alloys characterized by having a permeability of not more than 10 when tested by standard AFS permeability test comprising chromite sand, chromite flour and clay binder.

CROSS-REFERENCES TO OTHER APPLICATIONS

This is a continuation of my U.S. application Ser. No. 130,447, filed Apr. 1, 1971, and entitled, "Improvement in Refractory Sand Mixes and Molds and Cores" which is a continuation-in-part of my U.S. application Ser. No. 35,945, filed May 8, 1970, and entitled, "Refractory Molds and Cores," now abandoned, which was in turn a continuation-in-part of my U.S. application Ser. No. 799,551, filed Feb. 13, 1969, and entitled, "Improvement in Refractory Molds and Cores," also now abandoned.

BACKGROUND OF THE INVENTION

Refractory molds and cores made from refractory silica and/or zircon sands are susceptible to penetration by molten metal when used to form large ferrous castings; for example a roll of about 5,000 pounds or over, or a large non-ferrous casting such as a cast nut, of the high-tin and/or lead bronze types, weighing over 2,000 pounds. Refractory silica sands are not sufficiently refractory to resist hot molten ferrous metal without some fusion of the sand particles. The fused sand becomes mixed with the molten metal along the walls of the molds or cores and causes a roughened surface on the castings. Such roughened surfaces make it difficult to shake castings out of their molds. In addition, the roughened surfaces must be sand blasted and/or chipped clean prior to shipment of the castings. Refractory molds and cores made from coarse refractory zircon sands are susceptible to penetration by the molten metal. On the other hand, refractory molds and cores made from milled or finely divided zircon are so dense they crack during curing or cooling and fail to afford an avenue of escape for gases evolved during cooling of the molten metal.

The non-ferrous alloys of the aforementioned type have a wide temperature range of solidification due to their complex chemical compositions. They do not completely solidify until cooled below about 400° F. to 600° F. As a result the tin and/or lead of the alloy "bleed" into the pores of the refractory molds and cores resulting in scrap castings because of the poor condition of the surface.

It is an object of this invention to provide a refractory mix consisting of chromite sand, chromite flour and an inorganic material.

It is an object of this invention to provide a refractory mold and/or core consisting of chromite sand, chromite flour, and an inorganic material, said refractory mold and/ or core will set without application of heat thereto and which is sufficiently dense to resist penetration by molten metal.

It is an object of this invention to provide a refractory mold and/or core consisting of chromite sand, chromite flour, sodium silicate and ferrosilicon, said refractory mold and/or cores suitable for casting molten non-ferrous metal of the high lead and/or high tin bronze types.

It is an object of this invention to provide a refractory mold and/or core consisting of chromite sand, chromite flour and a mix of fireclay and bentonite and suitable for casting molten metal.

It is an object of this invention to provide a refractory mold and/or core consisting of chromite sand, chromite flour, and an inorganic material, said mold and/or core being sufficiently dense to resist penetration by molten ferrous metal and non-ferrous high lead and/or high tin copper alloys containing low temperature melting constituents.

SUMMARY OF THE INVENTION

Broadly, the invention is directed to a refractory mix consisting of chromite sand, chromite flour and at least one inorganic material, for example, sodium silicate, ferrosilicon, and a mix of fireclay and bentonite and to a refractory mold and/or core made therefrom. The refractory mold and/or core consists of chromite sand and chromite flour, an inorganic binder such as sodium silicate, ferrosilicon and a mix of fireclay and bentonite and has a permeability of not more than 10.

PREFERRED EMBODIMENT OF THE INVENTION

The invention is directed to a refractory mix and refractory mold and/or core made from said refractory mix. The refractory mold and/or core of this invention is particularly suitable for casting large ferrous castings, for example, cast iron blooming mill rolls of over 5,000 pounds and large non-ferrous castings, for example, high tin and/or lead bronze nuts of over 2,000 pounds.

I have found that the refractory chromite mold and/or core of this invention, characterized by a permeability of not more than 10 when measured by Standard AFS permeability test, can be made by forming a refractory chromite sand-chromite flour mix. Permeability of a mold or core is related to the packing arrangement of sand grains, i.e. chromite sand, which in turn is related to grain size, distribution, shape and amount of fines filling the interstices between the sand grains. Permeability is influenced by the manner in which additives envelop or separate the sand grains. Permeability is measured by the AFS approved method, as described in the Foundry Sand Handbook, 7th ed., 1963, pp. 7–10 to 7–14 in the section titled, "Determination of Foundry Sand," on a standard permeability meter wherein a 2 inch x 2 inch cylindrical sand specimen is subjected to a rate of air flow under a standard pressure. The air is forced through the specimen. A back pressure is developed. The back pressure is then converted to an AFS permeability number. The back pressure is usually converted by suitable electrical circuits directly into the AFS permeability number which may be read from a meter on the machine. The lower the AFS permeability number, the more dense the sand specimen. The mix contains about 50% to about 90% chromite sand and about 10% to about 50% chromite flour. The chromite sand has a particle size of about AFS 55/65 to about AFS 85/90 and the chromite flour has a particle size of about AFS —325. Chromite sand having a coarser particle size would not produce molds and/or cores sufficiently dense to resist penetration by the aforementioned molten metals. Chromite sand having a smaller particle size would not allow the chromite flour to fill the interstices therebetween resulting in porous molds and/or cores. Although many well known inorganic materials can be added to the mix, I prefer to use at least one inorganic material taken from the following, sodium silicate, ferrosilicon, or a mix of fireclay and bentonite. As is well known, sodium silicate is commercially available in a wide range of aqueous solutions and silica to sodium ratios. I prefer to use an aqueous solution of about 3% to 10% of sodium silicate having a silica ($SiO_2$) to sodium ($Na_2O$) ratio of about 1.90:1 to about 2.55:1. A sufficient amount of the sodium silicate solution is added to the refractory mix to aid in forming the mix into the desired mold. Preferably, this amount is about 2.5% to about 4.0% of the final refractory chromite sand-chromite flour mix. To aid in setting up the refractory mold and/or core and to decrease the time for setting-up, I add ferrosilicon to the mix containing sodium silicate. About 2% to about 3% of a 65% to about 80% ferrosilicon is sufficient to obtain the desired result. The mix of fireclay and bentonite which I add to the chromite sand-chromite flour mix can contain as much as 2 parts of fireclay to 1 part of bentonite or as little as 1 part of fireclay to 2 parts of bentonite, but it is preferred to use a 1:1 ratio of fireclay to bentonite. I have found that about 4.5% to about 7.0% of the fireclay and bentonite mix can be added to the refractory chromite sand-chromite flour mix.

Refractory chromite sand-chromite flour mold and/or core of the invention has been used to produce castings which are free of burned-in sand and not subject to penetration of the pores by the cast metal. The chilling effect of the chromite sand-chromite flour causes the cast metal to solidify rapidly thereby preventing "bleeding" of tin and/or lead when high tin and/or lead bronzes are cast.

In a specific example of the invention a refractory chromite sand-chromite flour mix was made by mixing together 160 pounds of chromite sand having a particle size of AFS 85/90 and 40 pounds of chromite flour having a particle size of AFS —325. After mulling for 3 minutes an inorganic material consisting of 5 pounds of bentonite and 6 pounds of fireclay was added to the chromite sand-chromite flour mix. Sufficient water to make up 3% of the final mix was then added, and the materials were mixed for three minutes. The resultant wet mix was then used to make a spade core which was used to form the coupling on a 45-inch slab mill steel roll. The roll was made to the following specification:

| Percent of— | C | Mn | P | S | Si | Ni | Cr | Mo |
|---|---|---|---|---|---|---|---|---|
| Maximum | .60 | .75 | (¹) | (¹) | .30 | 1.35 | .30 | .30 |
| Minimum | .70 | .95 | .05 | .05 | .45 | 1.55 | .45 | .40 |

¹ Maximum.

The cast steel roll weighed 67,000 pounds as shipped. Coupling was smooth as removed from the mold and required practically no cleaning.

In another specific example of the invention, the refractory mix of this invention was used to manufacture center cores used in casting tin bronze nuts weighing 4,400 pounds as shipped. The dry refractory mix was made by mixing 240 pounds of refractory chromite sand having a particle size of AFS 85/90 and 60 pounds of chromite flour having a particle size of AFS —325. The inorganic material, containing 9 pounds of a 52% aqueous solution of sodium silicate having a silica ($SiO_2$) to sodium ($Na_2O$) ratio of 2:1, and about 6.9 pounds of 75% ferrosilicon, was added to the refractory mix. The materials were mixed for five minutes. A mold made from the resultant mix was used to form the casting. No problems were encountered in shaking-out the casting. The casting was found to have excellent surfaces which were free of burned-in sand. No burned on sand on the mold was seen on the casting surface, thus indicating that there was no metal penetration of the mold.

In this specification and claims whereever percentages are noted such percentages are by weight.

It has been found that a refractory chromite sand-chromite flour mold or core of the invention has low density, good thermal stability and imparts a chilling effect to the molten metal cast therein to minimize penetration of the sand and to allow the passage of gas to decrease susceptibility to gas porosity and to produce large ferrous and non-ferrous castings having surfaces which require a minimum amount of cleaning.

I claim:

1. A heavy refractory sand mold suitable for receiving and molding a molten metal taken from the group consisting of steel and low melting high lead and high tin copper alloys into solidified large, bulky castings characterized by having smooth surfaces, said refractory sand mold characterized by having a permeability of not more than 10 when tested by standard AFS permeability test and consisting of:
   (a) about 50% to about 90% chromite sand having a particle size within the range of about AFS 55/65 and about AFS 85/90,
   (b) about 10% to about 50% chromite flour having a particle size of about AFS —325,
   (c) about 4.5% to about 7.0% of an inorganic binder consisting of a mixture of bentonite and fireclay in which the weight ratio of bentonite to fireclay is between about 2:1 to 1:2.

2. A method for producing heavy refractory molds and cores suitable for producing large, bulky castings of molten steel and molten high tin and high lead copper alloys, sand castings characterized by having smooth surfaces, said method comprising:
   (a) forming a refractory mix containing about 50% to about 90% chromite sand having a particle size of between AFS 55/65 and AFS 85/90, about 10% to about 50% chromite flour having a particle size of AFS —325, and about 4.5% to about 7.0% of an inorganic binder consisting of a mixture of bentonite and fireclay in which the weight ratio of bentonite to fireclay is between 2:1 to 1:2, and
   (b) molding the refractory mix to the desired refractory mold shape, which refractory mold is characterized by having a permeability of 10 when tested according to standard AFS permeability test.

References Cited
UNITED STATES PATENTS

| 1,437,584 | 12/1922 | Clapp | 106—66 |
| 1,657,573 | 1/1928 | Hanley | 106—38.9 |
| 2,230,939 | 2/1941 | Dunbeck | 106—38.9 |
| 2,256,456 | 9/1941 | Dietert | 106—38.9 |
| 2,790,218 | 4/1957 | Kohl et al. | 106—38.35 |
| 3,218,683 | 11/1965 | Nishiyama et al. | 106—38.3 |
| 3,406,029 | 10/1968 | Farrington et al. | 106—66 |

LORENZO B. HAYES, Primary Examiner

U.S. Cl. X.R.

106—38.9, 66, 67, 84